United States Patent [19]
Kakiage

[11] Patent Number: 5,916,311
[45] Date of Patent: Jun. 29, 1999

[54] BUS CONTROLLER AND INFORMATION PROCESSING DEVICE PROVIDING REDUCED IDLE CYCLE TIME DURING SYNCHRONIZATION

[75] Inventor: Touru Kakiage, Neyagawa, Japan

[73] Assignee: Matsushita Electric Industrial Co., Ltd., Kadoma, Japan

[21] Appl. No.: 08/821,596

[22] Filed: Mar. 20, 1997

[30] Foreign Application Priority Data

Mar. 27, 1996 [JP] Japan ................................ 8-072715

[51] Int. Cl.$^6$ ........................................ G06F 13/14
[52] U.S. Cl. ....................... 710/107; 710/104; 710/61; 713/401
[58] Field of Search .................... 395/284–287, 395/306–311, 551, 553, 556, 836, 892, 881, 882, 800.29–800.31, 800.43; 711/167

[56] References Cited

U.S. PATENT DOCUMENTS

| | | | |
|---|---|---|---|
| 5,175,820 | 12/1992 | Gephardt ................................ | 395/309 |
| 5,274,788 | 12/1993 | Koike .................................... | 395/425 |
| 5,293,603 | 3/1994 | MacWilliams et al. .................. | 711/1 |
| 5,434,996 | 7/1995 | Bell ........................................ | 395/550 |
| 5,524,270 | 6/1996 | Haess et al. ............................ | 395/880 |
| 5,590,369 | 12/1996 | Burgess et al. ........................ | 395/800 |
| 5,625,821 | 4/1997 | Record et al. .......................... | 395/670 |
| 5,640,585 | 6/1997 | Smooth, III et al. ................... | 395/800 |
| 5,694,586 | 12/1997 | Eneboe .................................. | 395/552 |
| 5,721,886 | 2/1998 | Miller .................................... | 395/551 |
| 5,727,171 | 3/1998 | Iachetta, Jr. ........................... | 395/287 |
| 5,745,768 | 4/1998 | England et al. ........................ | 395/706 |

FOREIGN PATENT DOCUMENTS

| | | |
|---|---|---|
| 4-10045 | 1/1992 | Japan . |
| 4156629 | 5/1992 | Japan . |

*Primary Examiner*—Ayaz R. Sheikh
*Assistant Examiner*—Raymond N Phan
*Attorney, Agent, or Firm*—Renner, Otto, Boisselle & Sklar, P.L.L.

[57] ABSTRACT

A bus controller controls an access to a bus connected to a first device which operates in synchronization with a first clock signal and a second device which operates in asynchronization with the first clock signal. The controller includes a detector. The detector receives an access request from a central processing unit which operates in synchronization with a second clock signal different from the first clock signal to detect whether the access request represents an access to the first device or an access to the second device. The controller further includes an access controlling signal generator. The access controlling signal generator generates a first access controlling signal for controlling an access of the first device to the bus in synchronization with the first clock signal and for supplying the first access controlling signal to the first device, in a case where the access request represents the access to the first device. The access controlling signal generator generates a second access controlling signal for controlling an access of the second device to the bus in synchronization with the second clock signal and for supplying the second access controlling signal to the second device, in a case where the access request represents the access to the second device.

14 Claims, 7 Drawing Sheets

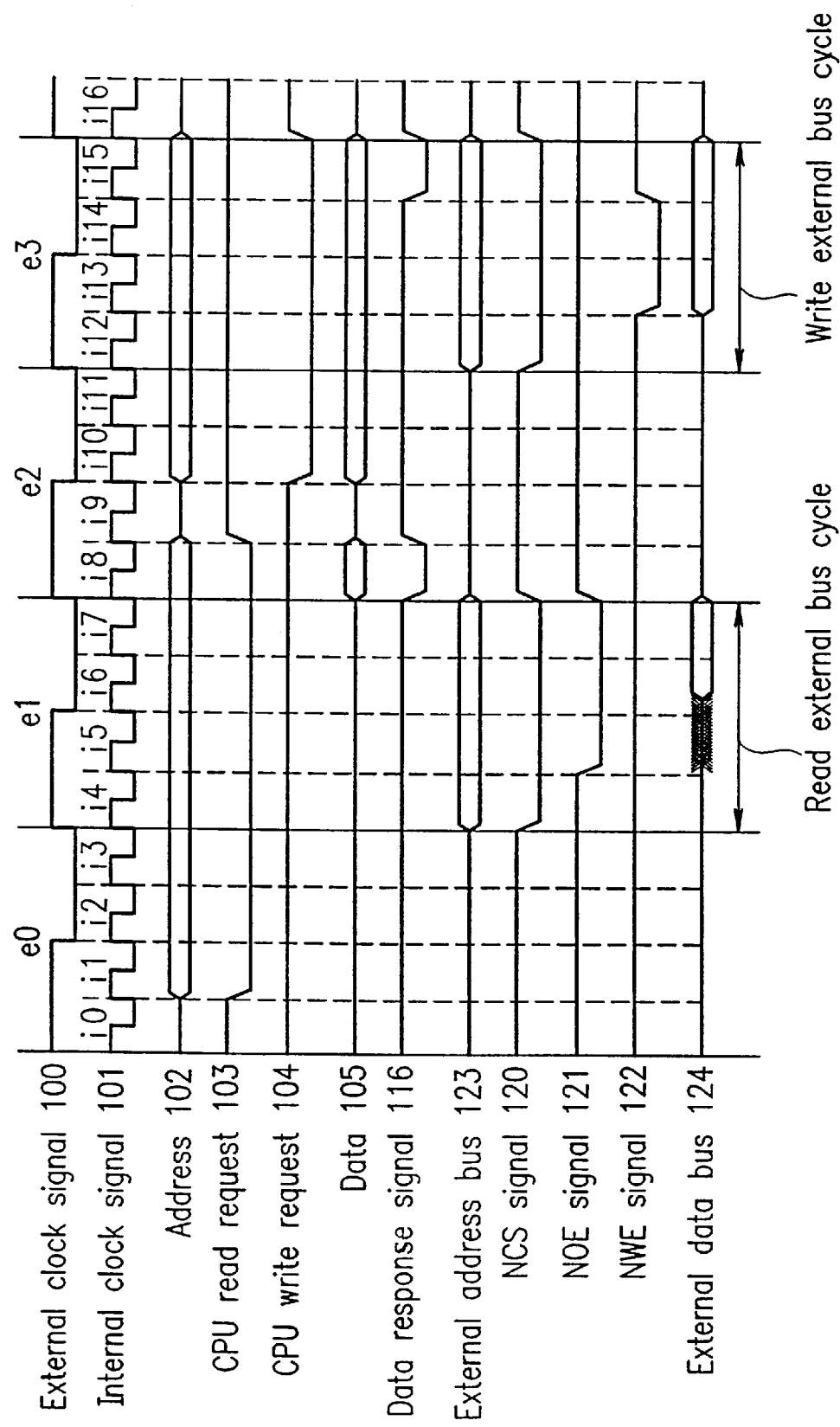

BUS CONTROLLER AND INFORMATION PROCESSING DEVICE PROVIDING REDUCED IDLE CYCLE TIME DURING SYNCHRONIZATION

BACKGROUND OF THE INVENTION

1. Field of the Invention

The present invention relates to a bus controller and an information processing device for performing control of the interface with an external bus at a high speed, with respect to a request for the use of the external bus.

2. Description of the Related Art

The performance of a semiconductor device such as a microcontroller and a microprocessor has been increasing as miniaturization and high speed circuitry of semiconductors have been developed. The promotion of the higher performance of the semiconductor is accompanied by higher speed of operation frequency of the semiconductor device. Among semiconductor devices, some operate at an operation frequency of several 100 MHz.

On the other hand, the operation frequency of the entire system employing the semiconductor device such as a microcontroller and a microprocessor is only about several 10 MHz. This is because it is necessary to consider various factors such as a signal delay between devices, operation rates of other devices, low power consumption, and the prevention of the generation of noises. For this reason, the semiconductor device such as a microcontroller and a microprocessor generally includes a frequency synthesizer such as PLL (Phase Locked Loop) inside the semiconductor device. The frequency synthesizer generates a high speed internal clock signal having a frequency several times the frequency of an external clock signal, and the high internal clock signal is used inside the semiconductor device.

A bus controller for controlling one or more external devices connected to an external bus to access the external bus is known in the art. The bus controller controls an access of the external device to the external bus in accordance with an access request from a processor.

The external device is classified into a synchronous external device and an asynchronous external device. The synchronous external device operates in synchronization with an external clock signal. The asynchronous external device does not require a clock signal input and operates in asynchronization with the clock signal.

In the case of the synchronous external device, the bus controller included in the processor generally generates an access controlling signal in synchronization with the external clock signal, and the access controlling signal is supplied to the synchronous external device so that the bus interface between the processor and the synchronous external device is controlled.

In the case where both of the synchronous external device and the asynchronous external device are connected to the same external bus, it may be assumed that the bus interface between the processor and the external device is controlled in the following manner: under the condition that a requirement necessary for the access controlling signal to access the asynchronous external device (e.g., a requirement regarding a timing at which the access controlling signal enters into a low level from a high level) is satisfied, a common access controlling signal generated in synchronization with the external clock signal is supplied to the both of the synchronous external device and the asynchronous external device. Such control of the bus interface is performed with no problems, in the case where the frequency of the external clock signal and the frequency of the internal clock signal are substantially equal. However, in the case where the frequency of the internal clock signal is higher than the frequency of the external clock signal, such control of the bus interface causes a problem that the start of the access to the asynchronous external device is delayed. This is because, since the access controlling signal for the asynchronous external device is generated in synchronization with the external clock signal, an idle cycle for waiting for synchronization with the external clock signal occurs.

Hereinafter, the operation of the asynchronous external device in the case where the common access controlling signal generated in synchronization with the external clock signal is supplied to both of the synchronous external device and the asynchronous external device will be described with reference to FIG. 7. The frequency of the internal clock signal used inside the processor is assumed to be four times the frequency of the external clock signal.

In FIG. 7, reference numeral 100 denotes an external clock signal, reference numeral 101 denotes an internal clock signal, reference numeral 102 denotes an address output from a CPU to a bus controller, reference numeral 103 denotes a read request signal output from the CPU to the bus controller, reference numeral 104 denotes a write request signal output from the CPU to the bus controller, reference numeral 105 denotes data which is input and output between the CPU and the bus controller, reference numeral 116 denotes a data response signal output from the bus controller to the CPU, reference numeral 120 denotes a chip select signal (hereinafter, referred to as an "NCS signal") indicating an external bus cycle period, reference numeral 121 denotes an output enable signal (hereinafter, referred to as an "NOE signal"), reference numeral 122 denotes a write enable signal (hereinafter, referred to as an "NWE signal"), reference numeral 123 denotes an external address bus, and reference numeral 124 denotes an external data bus.

In a cycle i1, the CPU makes a request for a read operation to the bus controller. The request for the read operation is made in such a manner that the CPU outputs the address 102 to the bus controller and the CPU asserts the read request signal 103. The asserted read request signal 103 is at a low level. The bus controller performs a synchronization process with the external clock signal 100, and starts an external bus cycle from a cycle e1 of the external clock signal 100.

During the period of the external bus cycle, the bus controller outputs a value of the address 102 to the external address bus 123, and asserts the NCS signal and the NOE signal. The asserted NCS signal and the NOE signal are at a low level. The external bus cycle autonomically ends depending on the number of cycles set in a register inside the processor. For example, the number of cycles of the example shown in FIG. 7 is one cycle.

In a period during which the NOE signal is being asserted (i.e., cycles i5, i6 and i7), data is read from the external device to the external data bus 124. The data is captured by the processor at the end of the cycle e1 (the end of the cycle i7).

In a cycle i8, the data response signal 116 is asserted, and data is supplied to the CPU. Thus, the read operation is completed.

In a cycle i10, the CPU makes a request for a write operation to the bus controller. The request for the write operation is made in such a manner that the CPU outputs the address 102 to the bus controller and the CPU asserts the write request signal 104. The asserted write request signal 104 is at a low level. The bus controller performs a synchronization process with the external clock signal 100, and starts an external bus cycle from a cycle e3 of the external clock signal 100.

During the period of the external bus cycle, the bus controller outputs a value of the address 102 to the external address bus 123, and asserts the NCS signal and the NWE signal. The asserted NCS signal and the NWE signal are at a low level. The external bus cycle autonomically ends depending on the number of cycles set in a register inside the processor. For example, the number of cycles of the example shown in FIG. 7 is one cycle.

In a period during which the NWE signal is asserted (i.e., cycles i13 and i14), a value of the external data bus 124 is written to the external device.

In a cycle i15, the data response signal 116 is asserted. Thus, the write operation is completed.

In this manner, although it is possible for the bus controller to start external access at the cycle i2, the bus controller starts the bus cycle at the cycle i4 after waiting for synchronization with the external clock signal for two cycles (cycles i2 and i3). This is because the bus controller generates an access controlling signal in synchronization with the external clock signal.

Similarly, although it is possible for the bus controller to start an external access at the cycle i11, the bus controller starts the bus cycle at the cycle i12 after waiting for synchronization with the external clock signal for one cycle (cycle i11). This is because the bus controller generates an access controlling signal in synchronization with the external clock signal.

As described above, in the case where the ratio of the frequency of the internal clock signal to the frequency of the external clock signal is 4, a maximum of three idle cycles for waiting for synchronization occur. The number of such a synchronization wait cycle increases with increasing the ratio of the frequency of the internal clock signal to the frequency of the external clock signal. In the case where the ratio is N, a maximum of (N−1) synchronization wait cycles occur.

Furthermore, in FIG. 7, in the case where the access time of the external device is equal to three cycles of the internal clock signal, the read operation from the external device should inherently end at the cycle i6. However, the read operation from the external device actually end at the cycle i7. This is because the access to the external device is performed in a cycle unit of the external clock signal. The same is applied to the write operation to the external device.

As described above, in the case where the processor accesses the external device in synchronization with the external clock signal, idle cycles are inserted due to waiting for synchronization with the external clock signal, though the processor is ready for the external access therein. This delays the start of the access to the external device, resulting in the degradation of the performance of the entire information processing device including the processor and the external device.

As described above, in light of the development of the semiconductor technique in recent years, the difference between the frequency of the external clock signal and the frequency of the internal clock signal tends to be increasingly larger. Therefore, there is a concern that the problem of the delay of the start of accessing the external device may become serious.

SUMMARY OF THE INVENTION

A bus controller according to the present invention controls an access to a bus connected to a first device which operates in synchronization with a first clock signal and a second device which operates in asynchronization with the first clock signal. The controller includes a detector and an access controlling signal generator. The detector receives an access request from a central processing unit which operates in synchronization with a second clock signal different from the first clock signal and for detecting whether the access request represents an access to the first device or an access to the second device. The access controlling signal generator generates a first access controlling signal for controlling an access of the first device to the bus in synchronization with the first clock signal and for supplying the first access controlling signal to the first device in a case where the access request represents the access to the first device. The access controlling signal generator generating a second access controlling signal for controlling an access of the second device to the bus in synchronization with the second clock signal and for supplying the second access controlling signal to the second device in a case where the access request represents the access to the second device.

In one embodiment of the invention, a frequency of the second clock signal is higher than a frequency of the first clock signal.

In another embodiment of the invention, the access request includes at least a part of an address which defines a position to be accessed in the first device and the second device.

In still another embodiment of the invention, the detector includes a synchronous clock data storage section and a selector. The synchronous clock data storage section stores a plurality of synchronous clock data. Each of the plurality of synchronous clock data determines whether an access to a corresponding address space among a plurality of address spaces is performed in synchronization with the first clock signal or the second clock signal. The selector selects one of the plurality of synchronous clock data stored in the synchronous clock data storage section in accordance with an identifying signal for identifying one of the plurality of address spaces.

In yet another embodiment of the invention, the access controlling signal generator includes a selector for selecting one of the first clock signal and the second clock signal based on a detection result of the detector, and a generator for generating one of the first access controlling signal and the second access controlling signal based on an output from the selector.

In another embodiment of the invention, the bus controller further includes a wait controller for generating a bus cycle ending signal for indicating an end of a bus cycle in synchronization with the second clock signal, and outputting the bus cycle ending signal to the access controlling signal generator.

In still another embodiment of the invention, the wait controller includes a wait cycle data storage section for storing a plurality of wait cycle data. Each of the plurality of wait cycle data represents a wait cycle number with respect to a corresponding address space among a plurality of address spaces in a cycle unit of the second clock signal. The wait controller further includes a selector for selecting one of the plurality of wait cycle data stored in the wait cycle data storage section in accordance with an identifying signal for identifying one of the plurality of address spaces, and a counter for counting a bus cycle number in a cycle unit of the second clock signal based on an output from the selector, and outputting the bus cycle ending signal in a case where the bus cycle number reaches a predetermined value.

According to another aspect of the invention, an information processing device includes a processor for receiving a first clock signal, a first device operating in synchronization with the first clock signal, a second device operating in asynchronization with the first clock signal and a bus for connecting the processor, the first device and the second device with each other. The processor includes a frequency synthesizer for generating a second clock signal different from the first clock signal based on the first clock signal, a central processing unit for operating in synchronization with the second clock signal, and a bus controller for controlling an access to the bus. The bus controller includes a detector for receiving an access request from the central processing unit and for detecting whether the access request represents an access to the first device or an access to the second device, and an access controlling signal generator for generating a first access controlling signal for controlling an access of the first device to the bus in synchronization with the first clock signal and for supplying the first access controlling signal to the first device, in a case where the access request represents the access to the first device, the access controlling signal generator generating a second access controlling signal for controlling an access of the second device to the bus in synchronization with the second clock signal and for supplying the second access controlling signal to the second device, in a case where the access request represents the access to the second device.

In one embodiment of the invention, a frequency of the second clock signal is higher than a frequency of the first clock signal.

In still another embodiment of the invention, the access request includes at least a part of an address which defines a position to be accessed in the first device and the second device.

In yet another embodiment of the invention, the detector includes a synchronous clock data storage section for storing a plurality of synchronous clock data. Each of the plurality of synchronous clock data determines whether an access to a corresponding address space among a plurality of address spaces is performed in synchronization with the first clock signal or the second clock signal. The detector further includes a selector for selecting one of the plurality of synchronous clock data stored in the synchronous clock data storage section in accordance with an identifying signal for identifying one of the plurality of address spaces.

In another embodiment of the invention, the access controlling signal generator includes a selector for selecting one of the first clock signal and the second clock signal based on a detection result of the detector, and a generator for generating one of the first access controlling signal and the second access controlling signal based on an output from the selector.

In another embodiment of the invention, the information processing device further includes a wait controller for generating a bus cycle ending signal for indicating an end of a bus cycle in synchronization with the second clock signal, and outputting the bus cycle ending signal to the access controlling signal generator.

In still another embodiment of the invention, the wait controller includes a wait cycle data storage section for storing a plurality of wait cycle data. Each of the plurality of wait cycle data represents a wait cycle number with respect to a corresponding address space among a plurality of address spaces in a cycle unit of the second clock signal. The wait controller further includes a selector for selecting one of the plurality of wait cycle data stored in the wait cycle data storage section in accordance with an identifying signal for identifying one of the plurality of address spaces, and a counter for counting a bus cycle number in a cycle unit of the second clock signal based on an output from the selector, and outputting the bus cycle ending signal in a case where the bus cycle number reaches a predetermined value.

Hereinafter, the function of the present invention will be described.

According to the present invention, in the case where an access request represents an access to the second device, the second access controlling signal is generated in synchronization with the second clock signal. Thus, an idle cycle for waiting for synchronization with the first clock signal does not occur.

Furthermore, according to the present invention, one of the plurality of synchronous clock data stored in the synchronous clock data storage section is selected in accordance with the identifying signal for identifying one of the plurality of address spaces. Thus, it is possible to switch the synchronous clock signal in the bus access for every address space.

Furthermore, according to the present invention, the selector for selecting one of the first clock signal and the second clock signal is provided, so that the access controlling signal is generated in accordance with the output from the selector. Thus, it is possible to switch the synchronous clock signal in the bus access, simply by switching the clock signal by the selector.

Furthermore, according to the present invention, the bus cycle ending signal is generated in synchronization with the second clock signal. Thus, it is possible to adjust the number of the bus cycle in a cycle unit of the second clock signal.

Furthermore, according to the present invention, one of the plurality of wait cycle data stored in the wait cycle data storage section is selected in accordance with the identifying signal for identifying one of the plurality of address spaces. Thus, it is possible to switch the number of the bus cycle for every address space.

Thus, the invention described herein makes possible the advantages of (1) providing a bus controller and an information processing device where an idle cycle for waiting for synchronization with the external clock signal does not occur from a time when the external bus cycle is ready to start inside the processor to a time when the external bus cycle actually starts; and (2) providing a bus controller and an information processing device where an external bus cycle time optimal for the access time to the external device can be obtained.

These and other advantages of the present invention will become apparent to those skilled in the art upon reading and understanding the following detailed description with reference to the accompanying figures.

BRIEF DESCRIPTION OF THE DRAWINGS

FIG. 7 is a timing chart showing an operation of a conventional asynchronous external device.

DESCRIPTION OF THE PREFERRED EMBODIMENTS

Hereinafter, the present invention will be described by way of examples with reference to the accompanying drawings.

Figure 1:
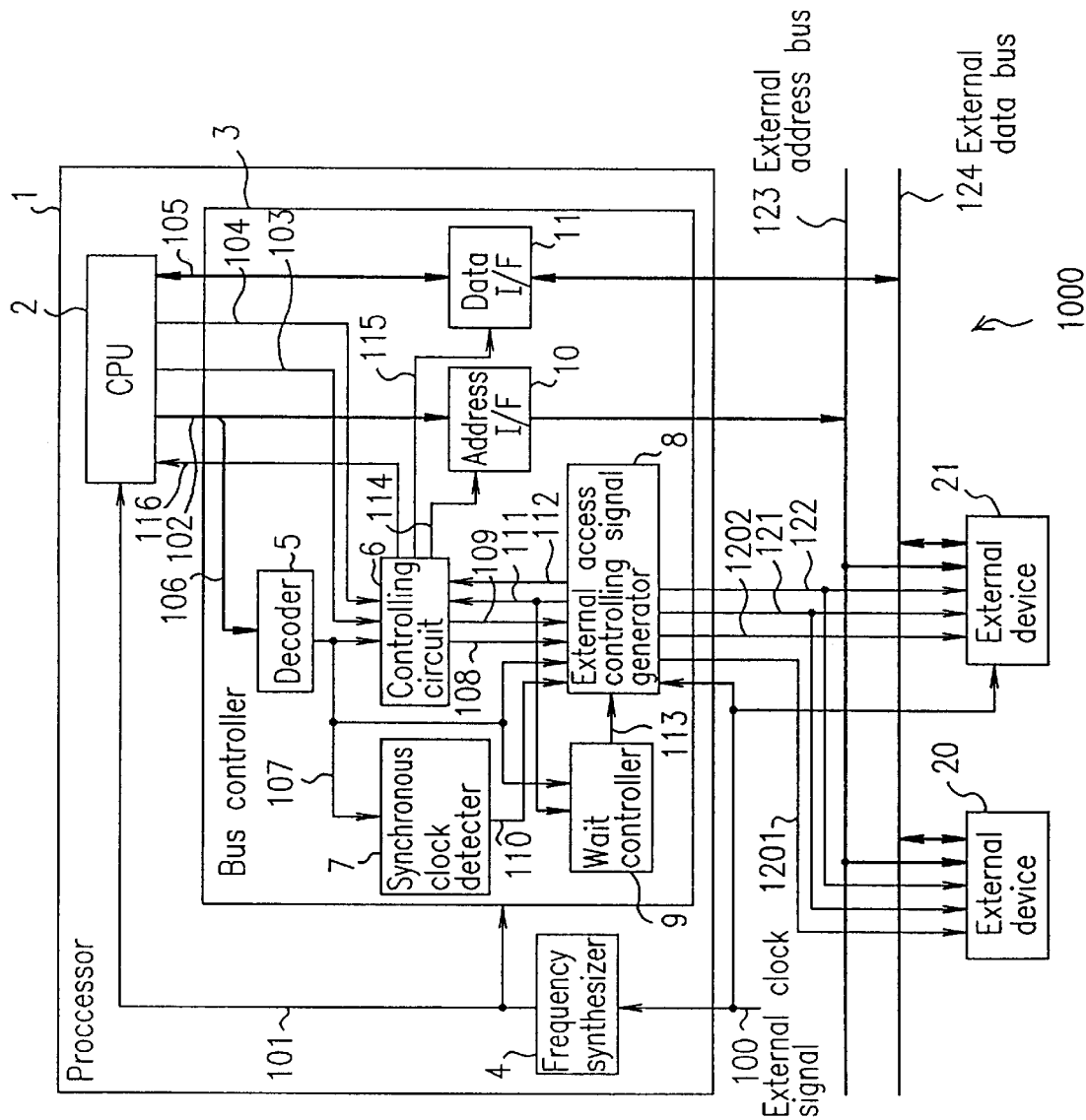
FIG. 1 is a block diagram showing a structure of an information processing device 1000 in an example of the present invention.

FIG. 1 shows a structure of an information processing device 1000 of an example of the present invention. The information processing device 1000 includes a processor 1, an external device 20 and an external device 21. The processor 1, the external device 20 and the external device 21 are connected to an external address bus 123 and an external data bus 124.

The external device 20 does not require any clock signal input, and operates in asynchronization with any clock signal. Therefore, the external clock signal 100 is not input to the external device 20. The external device 20 can be, for example, a memory for a general use.

The external device 21 operates in synchronization with the external clock signal 100. The external device 21 can be, for example, a general logic device such as a memory controller.

The processor 1 includes a central processing unit (hereinafter, referred to as a "CPU") 2, a bus controller 3 and a frequency synthesizer 4. The CPU 2 outputs an access request to the bus controller 3. The bus controller 3 controls an access of the external device 20 to the external address bus 123 and the external data bus 124, or controls an access of the external device 21 to the external address bus 123 and the external data bus 124, in accordance with the access request from the bus controller 3. The frequency synthesizer 4 generates an internal clock signal 101 having a frequency four times the frequency of the external clock signal 100. Such an internal clock signal 101 can be obtained by multiplying the external clock signal 100 by 4.

The CPU 2 operates in synchronization with the internal clock signal 101. The CPU 2 generates an address 102 defining positions to be accessed in the external device 20 and the external device 21, a read request signal 103 for requesting to read data and a write request signal 104 for requesting to write data. The address 102, the read request signal 103 and the write request signal 104 are input to the bus controller 3. Furthermore, the CPU 2 inputs data 105 to the bus controller 3, or receives the data 105 from the bus controller 3.

The bus controller 3 includes an address decoder 5, a controlling circuit 6, a synchronous clock detector 7, an external access controlling signal generator 8, a wait controller 9, an address interface section 10 and a data interface section 11.

The address decoder 5 receives a part of the address 102 as a decode address 106, and outputs the result obtained by decoding the decode address 106 as a space identifying signal 107. The space identifying signal 107 is used for identifying an address space to be accessed. For example, the space identifying signal 107 indicates either one of an address space corresponding to the external device 20 and an address space corresponding to the external device 21. Alternatively, the space identifying signal 107 may indicate one of a plurality of blocks included in the processor 1.

The controlling circuit 6 generates an initiating signal 108 for requesting to initiate an external bus cycle and a read-write signal (hereinafter, referred to as an "R/W signal") 109 for indicating whether the operation is read or write with respect to the external device in accordance with the space identifying signal 107, the read request signal 103 and the write request signal 104.

The controlling circuit 6 further generates an address controlling signal 114 for controlling the address interface section 10, a data controlling signal 115 for controlling the data interface section 11 and a data response signal 116. The data response signal 116 is supplied from the controlling circuit 6 to the CPU 2.

The synchronous clock detector 7 outputs a synchronous clock selecting signal 110 in accordance with the space identifying signal 107. The synchronous clock selecting signal 110 indicates either one of the external clock signal 100 and the internal clock signal 101 with which the external device should access the external address bus 123 and the external data bus 124 in synchronization.

Figure 2:
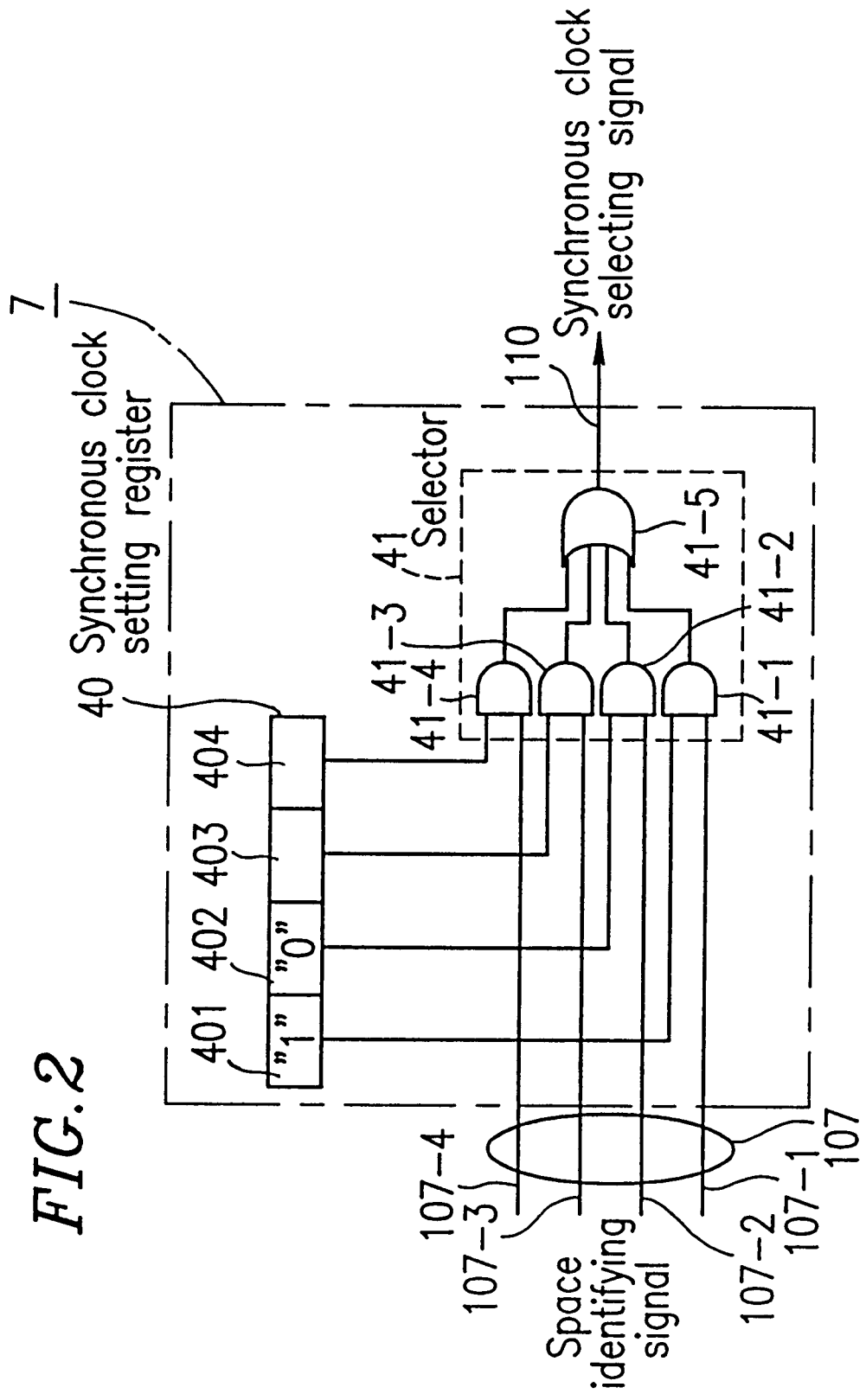
FIG. 2 is a block diagram showing a structure of a synchronous clock detector 7.

FIG. 2 shows a structure of the synchronous clock detector 7. The synchronous clock detector 7 includes a synchronous clock setting register 40 and a selector 41. In this example, it is assumed that the address space to be accessed is divided into four different address spaces. In this case, the space identifying signal 107 includes signals 107-1 to 107-4.

The synchronous clock setting register 40 stores synchronous clock data 401 to 404 corresponding to the four different address spaces. Each of the synchronous clock data 401 to 404 has a value "1" or a value "0". The value "1" indicates that the address space identified by the space identifying signal 107 is to be accessed in synchronization with the internal clock signal 101. The value "0" indicates that the address space identified by the space identifying signal 107 is to be accessed in synchronization with the external clock signal 100.

The selector 41 outputs the synchronous clock selecting signal 110 in accordance with the space identifying signal 107 (signals 107-1 to 107-4) and the synchronous clock data 401 to 404. The selector 41 includes AND circuits 41-1 to 41-4 and an OR circuit 41-5. A corresponding signal among the signals 107-1 to 107-4 and a corresponding synchronous clock data among the synchronous clock data 401 to 404 are input to each of the AND circuits 41-1 to 41-4. The outputs of the AND circuits 41-1 to 41-4 are input to the OR circuit 41-5. The output of the OR circuit 41-5 is output as the synchronous clock selecting signal 110.

In the case where the space identifying signal 107 indicates the address space corresponding to the external device 20, among signals 107-1 to 107-4, only the signal 107-1 is at a high level. Therefore, the output of the AND circuit 41-1 is at a high level. This is because the signal 107-1 at a high level and the synchronous clock data 401 having the value "1" are input to the AND circuit 41-1. As a result, the selector 41 outputs the synchronous clock selecting signal 110 at a high level.

In the case where the space identifying signal 107 indicates the address space corresponding to the external device 21, among signals 107-1 to 107-4, only the signal 107-2 is at a high level. However, none of the outputs of the AND circuits 41-1 to 41-4 is at a high level. This is because the synchronous clock data 402 corresponding to the signal 107-2 has the value "0". As a result, the selector 41 outputs the synchronous clock selecting signal 110 at a low level.

The external access controlling signal generator 8 generates an external access controlling signal in accordance with the space identifying signal 107, the initiating signal 108, the read-write signal 109 and the synchronous clock selecting signal 110. The external access controlling signal is a signal for controlling the external device 20 or the external device 21 to access the external address bus 123 and the external data bus 124. In the case where the synchronous clock selecting signal is at a high level, the external access controlling signal generator 8 generates an external access controlling signal in synchronization with the internal clock signal 101. In the case where the synchronous clock selecting signal is at a low level, the external access controlling signal generator 8 generates an external access controlling signal in synchronization with the external clock signal 100.

In this example, the external access controlling signal generator 8 generates a chip select signal 1201 (hereinafter, referred to as an "NCS (1)" as well) for indicating whether or not the external device 20 is activated, a chip select signal 1202 (hereinafter, referred to as an "NCS (2)" as well) for indicating whether or not the external device 21 is activated, an output enable signal 121 (hereinafter, referred to as an "NOE") and a write enable signal 122 (hereinafter, referred to as an "NWE") as external access controlling signals. The chip select signal 1201, the output enable signal 121 and the write enable signal 122 are input to the external device 20. These signals supplied to the external device 20 are used as a control for the external device 20 to access the external address bus 123 and the external data bus 124. The chip select signal 1202, the output enable signal 121 and the write enable signal 122 are input to the external device 21. These signals supplied to the external device 21 are used to control for the external device 21 to access the external address bus 123 and the external data bus 124.

The external access controlling signal generator 8 further generates a bus cycle signal 111 for indicating an eternal bus cycle period and a data output signal 112 for indicating a timing at which data is to be output to the external data bus 124 at the time of writing to the external device.

Figure 3:
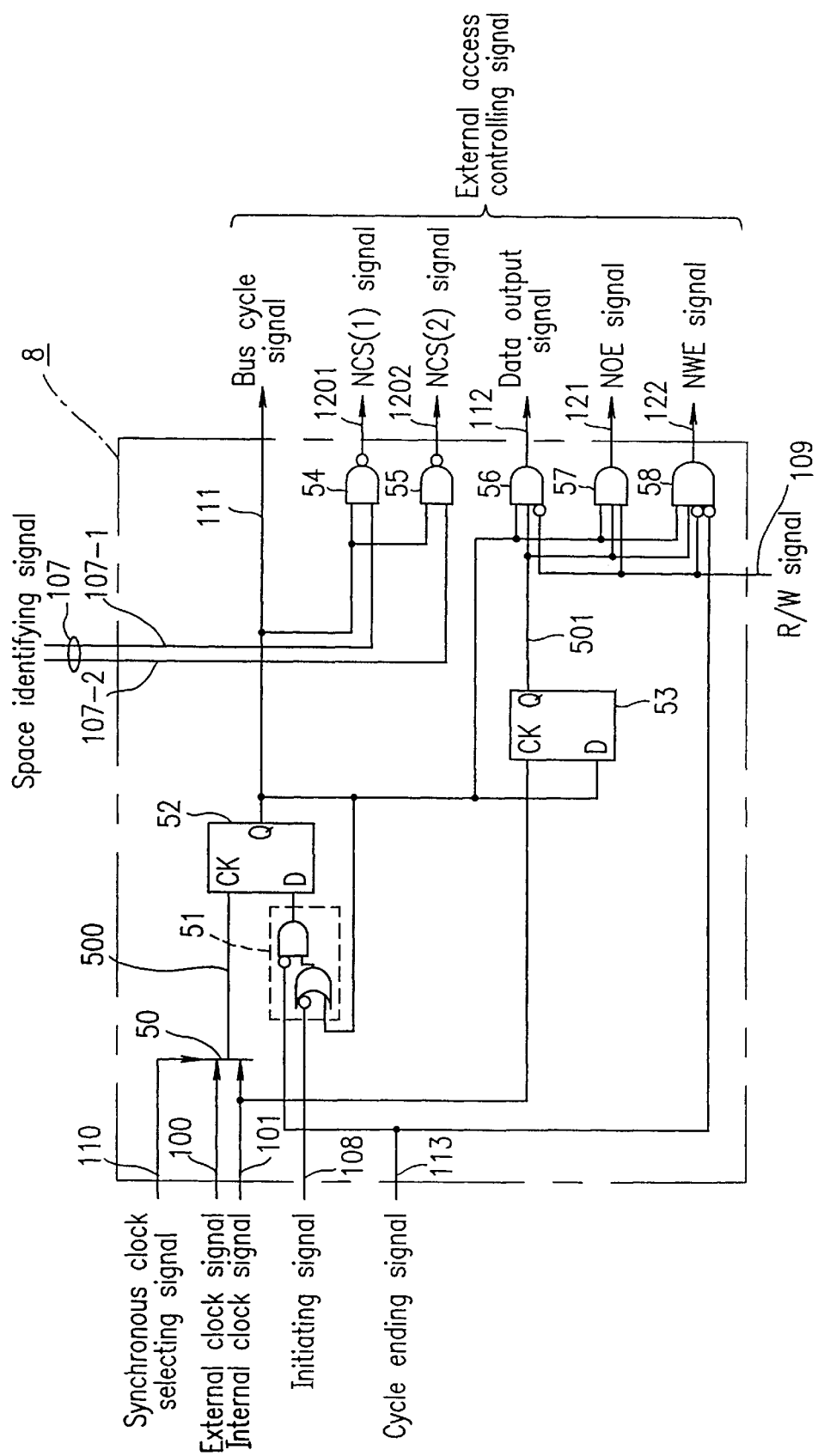
FIG. 3 is a block diagram showing a structure of an external access controlling signal generator 8.

FIG. 3 shows a structure of the external access controlling signal generator 8. The external access controlling signal generator 8 includes a selector 50, logic circuits 51, 54 to 58 and flip-flops 52 and 53.

The selector 50 selects either one of the external clock signal 100 and the internal clock signal 101 in accordance with the synchronous clock selecting signal 110. In the case where the synchronous clock selecting signal 110 is at a high level, the internal clock signal 101 is selected by the selector 50. As a result, the internal clock signal 101 is input to a clock input CK of the flip-flop 52 as an output from the selector 50 (i.e., an external access synchronous clock signal 500). This means that the external access controlling signal is generated in synchronization with the internal clock signal 101. In the case where the synchronous clock selecting signal 110 is at a low level, the external clock signal 100 is selected by the selector 50. As a result, the external clock signal 100 is input to a clock input CK of the flip-flop 52 as an output from the selector 50 (i.e., an external access synchronous clock signal 500). This means that the external access controlling signal is generated in synchronization with the external clock signal 100.

The wait controller 9 generates a cycle ending signal 113 for indicating the end of the external bus cycle in accordance with the space identifying signal 107 and the bus cycle signal 111.

Figure 4:
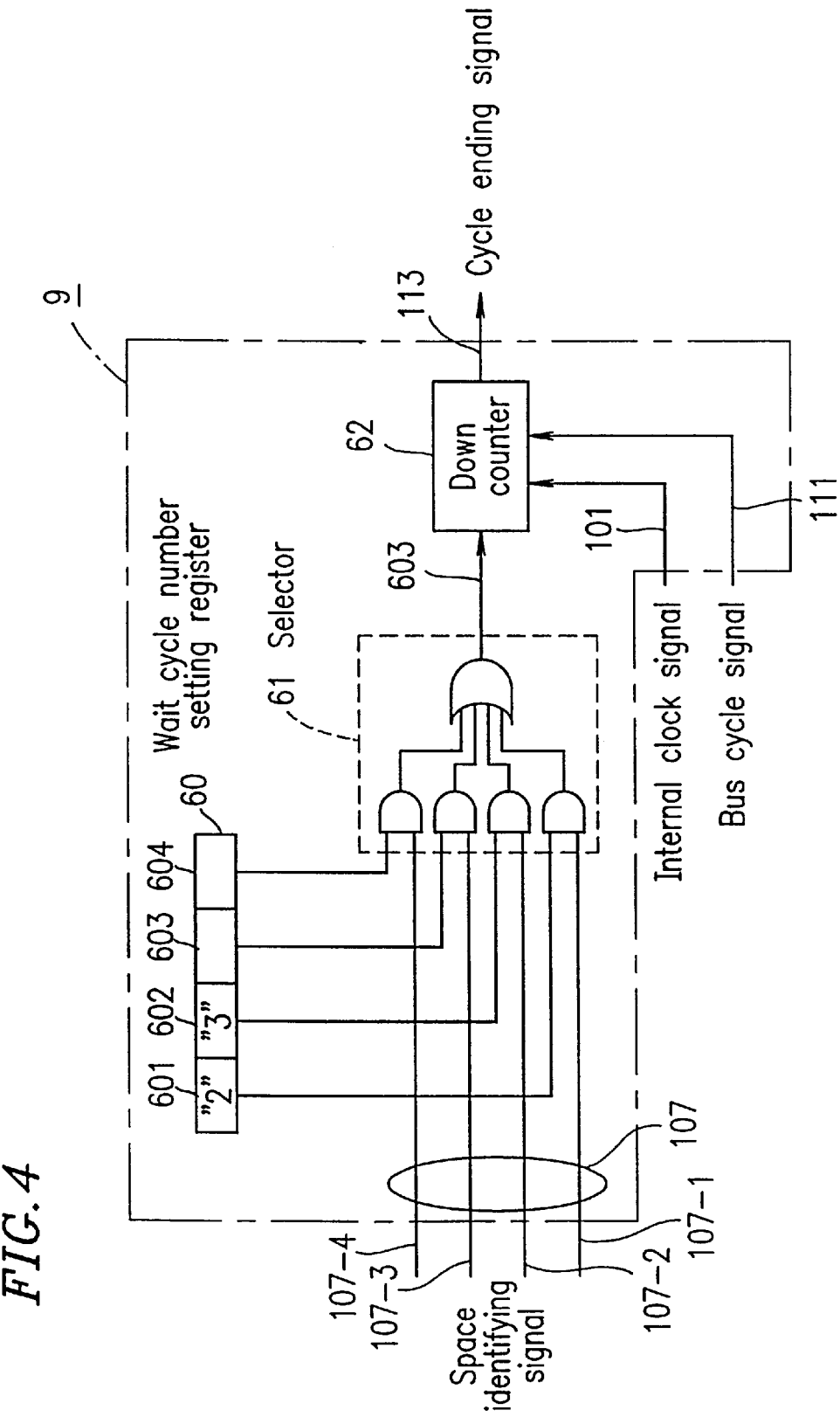
FIG. 4 is a block diagram showing a structure of a wait controller 9.

FIG. 4 shows a structure of the wait controller 9. The wait controller 9 includes a wait cycle number setting register 60, a selector 61 and a down counter 62.

The wait cycle number setting register 60 stores data 601 to 604 for indicating a wait cycle number, corresponding to the four different address spaces. The data 601 has, for example, a value "2". The value "2" indicates that the number of wait cycles in the address space corresponding to the external device 20 is two. The data 602 has, for example, a value "3". The value "3" indicates that the number of wait cycles in the address space corresponding to the external device 21 is three. Herein, the number of bus cycles is equal to the number of cycles of the internal clock signal 101 (i.e., the number of wait cycles+1).

The selector 61 outputs a signal 603 in accordance with the space identifying signal 107 (signals 107-1 to 107-4) and the data 601 to 604. The signal 603 is used for setting a count value of the down counter 62 to an initial value. In the case where the bus cycle signal 111 is asserted, the down counter 62 decrements the count value by 1 in synchronization with the internal clock signal 101. When the count value of the down counter 62 reaches "0", the down counter 62 asserts the cycle ending signal 113.

Hereinafter, the operation of the information processing device 1000 will be described.

Figure 5:
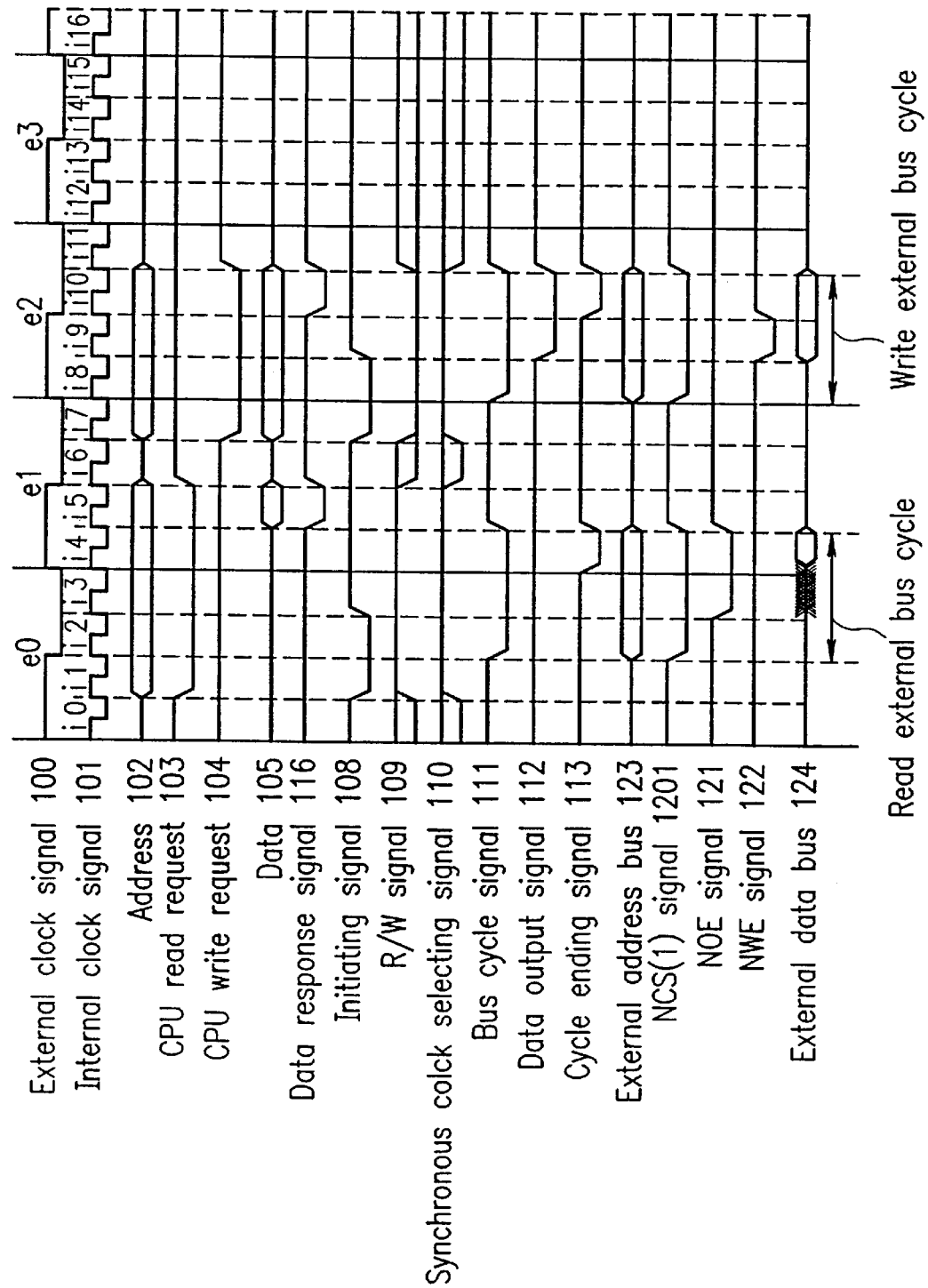
FIG. 5 is a timing chart showing read and write operations with respect to an external device 20.

FIG. 5 shows a read operation and a write operation to the external device 20 which operates in asynchronization with the external clock signal 100. In the example shown in FIG. 5, the access time to the external device 20 is assumed to be equal to three cycles of the internal clock signal 101 at the time of both reading and writing. The write to the external device 20 is completed in 2 cycles, and the third cycle is a cycle for ensuring a hold time of the write data.

Figure 6:
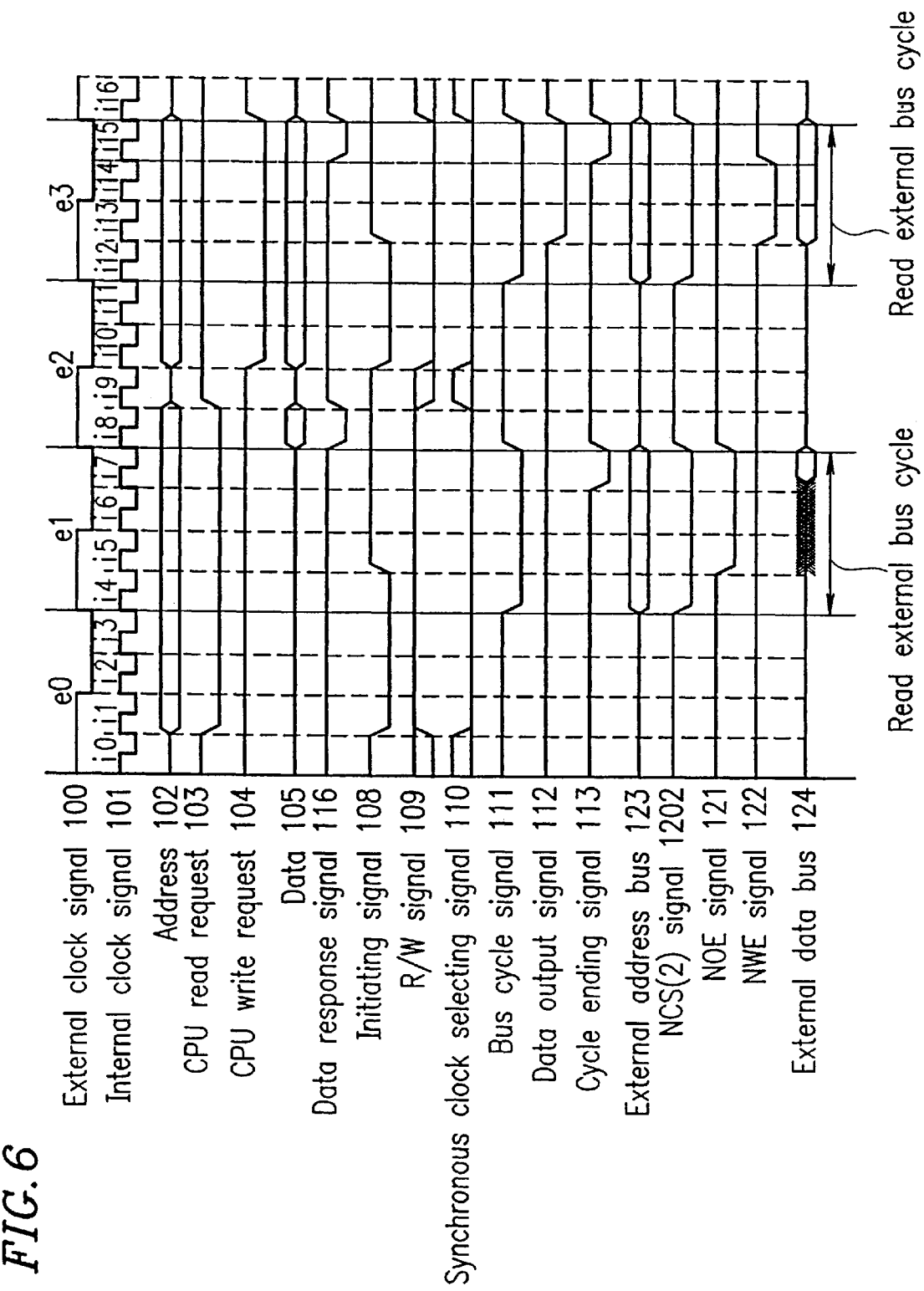
FIG. 6 is a timing chart showing read and write operations with respect to an external device 21.

FIG. 6 shows a read operation and a write operation to the external device 21 which operates in synchronization with the external clock signal 100. In the example shown in FIG. 6, the access time to the external device 21 is assumed to be equal to one cycle of the external clock signal 100 (i.e, four cycles of the internal clock signal 101) at the time of both read and write.

The internal clock signal 101 can be obtained by multiplying the external clock signal 100 by 4 by the frequency synthesizer 4 in the processor 1.

(1) Read operation from the external device 20 (FIG. 5)
(Cycle i1)

The CPU 2 makes a request for a read operation to the bus controller 3. The request for the read operation is made in such a manner that the CPU 2 outputs the address 102 to the bus controller 3, and the CPU 2 asserts the read request signal 103.

The bus controller 3 receives the address 102 and the read request signal 103 from the CPU 2.

In the bus controller 3, the address decoder 5 receives a part of the address 102 as a decode address 106, and decodes the decode address 106. An output from the address decoder 5 is supplied to the controlling circuit 6, the synchronous clock detector 7, the external access controlling signal generator 8 and the wait controller 9 as a space identifying signal 107. Herein, the space identifying signal 107 is assumed to indicate the address space corresponding to the external device 20.

The controlling circuit 6 detects the read request to the external device 20 in accordance with the read request signal 103 and the space identifying signal 107, and examines whether or not the external bus (the external address bus 123 and the external data bus 124) is busy. Since the external bus is not busy in the cycle i1, the controlling circuit 6 asserts the initiating signal 108, and allows the R/W signal 109 to become high. The high level of the R/W signal 109 represents the read operation. The initiating signal 108 and the R/W signal 109 are supplied to the external access controlling signal generator 8.

The synchronous clock detector 7 detects whether the external bus cycle is to be initiated and ended in synchronization with the external clock signal 100, or the external bus cycle is to be initiated and ended in synchronization with the internal clock signal 101. Hereinafter, such detection is referred to as "detection of a synchronous clock signal".

The synchronous clock detector 7 outputs the synchronous clock selecting signal 110 in accordance with the space identifying signal 107. As described above, in the cycle i1, the space identifying signal 107 indicates the address space corresponding to the external device 20. Therefore, the synchronous clock detector 7 outputs the synchronous clock selecting signal 110 at a high level. The high level of the synchronous clock selecting signal 110 represents that the external bus cycle is to be initiated and ended in synchronization with the internal clock signal 101. The synchronous clock selecting signal 110 is supplied to the external access controlling signal generator 8.

(Cycle i2)

Since the synchronous clock selecting signal 110 is at a high level, the selector 50 in the external access controlling signal generator 8 outputs the internal clock signal 101 to the flip-flop 52 as the external access synchronous clock signal 500. The flip-flop 52 latches the asserted initiating signal 108 in response to the rising edge of the internal clock signal 101. Thus, the bus cycle signal 111 is asserted. The assertion of the bus cycle signal 111 indicates the start of the external bus cycle. Furthermore, the NCS (1) signal is asserted by the logic circuit 54 in accordance with the space identifying signal 107. The assertion of the NCS (1) signal indicates the start of the access to the external device 20.

When the bus cycle signal 111 is asserted, the controlling circuit 6 outputs an address controlling signal 114 to the address interface section 10. The address interface section 10 outputs a value of the address 102 to the external address bus 123 in response to the address controlling signal 114.

Furthermore, when the bus cycle signal 111 is asserted, the wait controller 9 starts counting the number of bus cycles. The value of the data 601, "2", is previously set as an initial value for a count value of the down counter 62 in the wait controller 9.

(Cycle i3)

Since the bus cycle signal 111 is asserted, the initiating signal 108 is negated. Furthermore, because of the read operation, the NOE signal is asserted by the logic circuit 57 in the external access controlling signal generator 8. The NOE signal is asserted one cycle later than the start of the bus cycle by the flip-flop 53 and the logic circuit 57. This is done in order to prevent the conflict of data on the external data bus 124 in the case where the data is read from a plurality of external devices.

When the NOE signal is asserted, the read of data from the external device 20 starts. As a result, data read from the external device 20 is output to the external data bus 124.

(Cycle i4)

The cycle i4 corresponds to the third cycle from the start of the bus cycle. The count value of the down counter 62 in the wait controller 9 becomes "0". Therefore, a cycle ending signal 113 indicating the end of the bus cycle is asserted. Thus, the bus cycle ends. The data interface section 11 captures data on the external data bus 124.

(Cycle i5)

Since the cycle ending signal 113 is asserted, the address output to the external address bus 123 ends. Furthermore, the NCS (1) signal and the NOE signal are negated. The moment the data response signal 116 is asserted by the controlling circuit 6, data read on the external data bus 124 is transferred to the CPU 2 via the data interface section 11. Thus, the read operation from the external device 20 based on the read operation request from the CPU 2 is completed.

(2) Write operation to the external device 20 (FIG. 5)

(Cycle i7)

The CPU 2 makes a request for a write operation to the bus controller 3. The request for the write operation is made in such a manner that the CPU 2 outputs the address 102 to the bus controller 3, and the CPU 2 asserts the write request signal 104.

The bus controller 3 receives the address 102 and the write request signal 104 from the CPU 2.

In the bus controller 3, the address decoder 5 receives a part of the address 102 as a decode address 106, and decodes the decode address 106. An output from the address decoder 5 is supplied to the controlling circuit 6, the synchronous clock detector 7, the external access controlling signal generator 8 and the wait controller 9 as the space identifying signal 107. Herein, the space identifying signal 107 is assumed to indicate the address space corresponding to the external device 20.

The controlling circuit 6 detects the write request to the external device 20 in accordance with the write request signal 104 and the space identifying signal 107, and examines whether or not the external bus (the external address bus 123 and the external data bus 124) is busy. Since the external bus is not busy in the cycle i7, the controlling circuit 6 asserts the initiating signal 108, and allows the R/W signal 109 to become low. The low level of the R/W signal 109 represents the write operation. The initiating signal 108 and the R/W signal 109 are supplied to the external access controlling signal generator 8.

The synchronous clock detector 7 performs the detection of a synchronous clock signal, and outputs the synchronous clock selecting signal 110 at a high level. The high level of the synchronous clock selecting signal 110 represents that the external bus cycle is to be initiated and ended in synchronization with the internal clock signal 101. The synchronous clock selecting signal 110 is supplied to the external access controlling signal generator 8.

(Cycle i8)

Since the synchronous clock selecting signal 110 is at a high level, the selector 50 in the external access controlling signal generator 8 outputs the internal clock signal 101 to the flip-flop 52 as the external access synchronous clock signal 500. The flip-flop 52 latches the asserted initiating signal 108 in response to the rising edge of the internal clock signal 101. Thus, the bus cycle signal 111 is asserted. The assertion of the bus cycle signal 111 indicates the start of the external bus cycle. Furthermore, the NCS (1) signal is asserted by the logic circuit 54 in accordance with the space identifying signal 107. The assertion of the NCS (1) signal indicates the start of the access to the external device 20.

When the bus cycle signal 111 is asserted, the controlling circuit 6 outputs an address controlling signal 114 to the address interface section 10. The address interface section 10 outputs a value of the address 102 to the external address bus 123 in response to the address controlling signal 114.

Furthermore, when the bus cycle signal 111 is asserted, the wait controller 9 starts counting the number of bus cycles. The value of the data 601, "2", is previously set as an initial value for a count value of the down counter 62 in the wait controller 9.

(Cycle i9)

Since the bus cycle signal 111 is asserted, the initiating signal 108 is negated. Furthermore, because of the write operation, the data output signal 112 is asserted by the logic circuit 56 in the external access controlling signal generator 8, and the NWE signal is asserted by the logic circuit 58. The data output signal 112 and the NWE signal are asserted one cycle later than the start of the bus cycle by the flip-flop 53 and the logic circuits 56 and 58. This is done in order to prevent the writing of data to a plurality of external devices.

When the data output signal 112 is asserted, the controlling circuit 6 outputs a data controlling signal 115 to the data interface section 11. A value of the data 105 is output to the external data bus 124 in response to the data controlling signal 115. Furthermore, when the NWE signal is asserted, the writing of data to the external device 20 starts. The NWE signal is asserted only in this cycle, and the writing to the external device is executed in this cycle.

(Cycle i10)

The cycle i10 corresponds to the third cycle from the start of the bus cycle. The count value of the down counter 62 in the wait controller 9 becomes "0". Therefore, a cycle ending signal 113 indicating the end of the bus cycle is asserted. Thus, the bus cycle ends. Furthermore, the data response signal 116 is asserted by the controlling circuit 6. Thus, the write operation to the external device 20 based on the write operation request from the CPU 2 is completed.

As described above, according to the information processing device 1000 of the present invention, the external bus cycle can start in synchronization with the internal clock signal 101 with respect to the external device 20 which operates in asynchronization with the clock signal. Furthermore, the number of external bus cycles can be set based on the internal clock signal 101. Thus, the external device 20 can operate in a higher speed than the conventional device with respect to a series of operations that the CPU 2 requests the read operation in the cycle i1, and the CPU 2 requests the write operation one cycle after the read operation is completed. For example, according to the conventional operation timing shown in FIG. 7, the write operation is completed in the cycle i15. On the other hand, according to the operation timing (FIG. 5) of the information processing device 1000 of the present invention, the write operation is completed in the cycle i10.

(3) Read operation from the external device 21 (FIG. 6)

(Cycle i1)

The CPU 2 makes a request for a read operation to the bus controller 3. The request for the read operation is made in such a manner that the CPU 2 outputs the address 102 to the bus controller 3, and the CPU 2 asserts the read request signal 103.

The bus controller 3 receives the address 102 and the read request signal 103 from the CPU 2.

In the bus controller 3, the address decoder 5 receives a part of the address 102 as a decode address 106, and decodes the decode address 106. An output from the address decoder 5 is supplied to the controlling circuit 6, the synchronous clock detector 7, the external access controlling signal generator 8 and the wait controller 9 as a space identifying signal 107. Herein, the space identifying signal 107 is assumed to indicate the address space corresponding to the external device 21.

The controlling circuit 6 detects the read request to the external device 21 in accordance with the read request signal 103 and the space identifying signal 107, and examines whether or not the external bus (the external address bus 123 and the external data bus 124) is busy. Since the external bus is not busy in the cycle i1, the controlling circuit 6 asserts the initiating signal 108, and allows the R/W signal 109 to become high. The high level of the R/W signal 109 represents the read operation. The initiating signal 108 and the R/W signal 109 are supplied to the external access controlling signal generator 8.

The synchronous clock detector 7 performs the detection of the synchronous clock signal, and outputs a synchronous clock selecting signal 110 at a low level. The low level of the synchronous clock selecting signal 110 represents that the external bus cycle is initiated and ended in synchronization with the external clock signal 100. The synchronous clock selecting signal 110 is supplied to the external access controlling signal generator 8.

(Cycle i2)

Since the synchronous clock selecting signal 110 is at a low level, the selector 50 in the external access controlling signal generator 8 outputs the internal clock signal 101 to the flip-flop 52 as the external access synchronous clock signal 500. In the cycle i2, the bus cycle signal 111 is not asserted, because the bus cycle signal 111 is asserted in synchronization with the external clock signal 100. Therefore, in the cycle i2, the external bus cycle does not start.

(Cycle i3)

The start of the external bus cycle is being awaited.

(Cycle i4)

The flip-flop 52 latches the initiating signal 108 asserted in response to the rising edge of the external clock signal 100. Thus, the bus cycle signal 111 is asserted. The assertion of the bus cycle signal 111 indicates the start of the external bus cycle. Furthermore, the NCS (2) signal is asserted by the logic circuit 55 in accordance with the space identifying signal 107. The assertion of the NCS (2) signal indicates the start of the access to the external device 21.

When the bus cycle signal 111 is asserted, the controlling circuit 6 outputs an address controlling signal 114 to the address interface section 10. The address interface section 10 outputs a value of the address 102 to the external address bus 123 in response to the address controlling signal 114.

Furthermore, when the bus cycle signal 111 is asserted, the wait controller 9 starts counting the number of bus cycles. The value of the data 602, "3", is previously set as an initial value for a count value of the down counter 62 in the wait controller 9.

(Cycle i5)

Since the bus cycle signal 111 is asserted, the initiating signal 108 is negated. Furthermore, because of the read operation, the NOE signal is asserted by the logic circuit 57 in the external access controlling signal generator 8. The NOE signal is asserted one cycle later than the start of the bus cycle by the flip-flop 53 and the logic circuit 57.

When the NOE signal is asserted, the read of data from the external device 21 starts. As a result, data read from the external device 21 is output to the external data bus 124.

(Cycle i6)

The read operation from the external device 21 is under way.

(Cycle i7)

The cycle i7 corresponds to the forth cycle from the start of the bus cycle. The count value of the down counter 62 in the wait controller 9 becomes "0". Therefore, a cycle ending signal 113 indicating the end of the bus cycle is asserted. Thus, the bus cycle ends. The data interface section 11 captures data on the external data bus 124.

(Cycle i8)

Since the cycle ending signal 113 is asserted, the external address output to the external address bus 123 ends. Furthermore, the NCS (2) signal and the NOE signal are negated. The moment the data response signal 116 is asserted by the controlling circuit 6, data read on the external data bus 124 is transferred to the CPU 2 via the data interface section 11. Thus, the read operation from the external device 21 based on the read operation request from the CPU 2 is completed.

(2) Write operation to the external device 21 (FIG. 6)
(Cycle i10)

The CPU 2 makes a request for a write operation to the bus controller 3. The request for the write operation is made in a such a manner that the CPU 2 outputs the address 102 to the bus controller 3, and the CPU 2 asserts the write request signal 104.

The bus controller 3 receives the address 102 and the write request signal 104 from the CPU 2.

In the bus controller 3, the address decoder 5 receives a part of the address 102 as a decode address 106, and decodes the decode address 106. An output from the address decoder 5 is supplied to the controlling circuit 6, the synchronous clock detector 7, the external access controlling signal generator 8 and the wait controller 9 as the space identifying signal 107. Herein, the space identifying signal 107 is assumed to indicate the address space corresponding to the external device 21.

The controlling circuit 6 detects the write request to the external device 21 in accordance with the write request signal 104 and the space identifying signal 107, and examines whether or not the external bus (the external address bus 123 and the external data bus 124) is busy. Since the external bus is not busy in the cycle i10, the controlling circuit 6 asserts the initiating signal 108, and allows the R/W signal 109 to become low. The low level of the R/W signal 109 represents the write operation. The initiating signal 108 and the R/W signal 109 are supplied to the external access controlling signal generator 8.

The synchronous clock detector 7 performs the detection of a synchronous clock signal, and outputs the synchronous clock selecting signal 110 at a low level. The low level of the synchronous clock selecting signal 110 represents that the external bus cycle is to be initiated and ended in synchronization with the internal clock signal 101. The synchronous clock selecting signal 110 is supplied to the external access controlling signal generator 8.

(Cycle i11)

Since the synchronous clock selecting signal 110 is at a low level, the selector 50 in the external access controlling signal generator 8 outputs the external clock signal 100 to the flip-flop 52 as an external access synchronous clock signal 500. In the cycle i11, the bus cycle signal 111 is not asserted, because the bus cycle signal 111 is asserted in synchronization with the external clock signal 100. Therefore, in the cycle i11, the external bus cycle does not start.

(Cycle i12)

The flip-flop 52 latches the initiating signal 108 asserted in response to the rising edge of the external clock signal 100. Thus, the bus cycle signal 111 is asserted. The assertion of the bus cycle signal 111 indicates the start of the external bus cycle. Furthermore, the NCS (2) signal is asserted by the logic circuit 55 in accordance with the space identifying signal 107. The assertion of the NCS (2) signal indicates the start of the access to the external device 21.

When the bus cycle signal 111 is asserted, the controlling circuit 6 outputs an address controlling signal 114 to the address interface section 10. The address interface section 10 outputs a value of the address 102 to the external address bus 123 in response to the address controlling signal 114.

Furthermore, when the bus cycle signal 111 is asserted, the wait controller 9 starts counting the number of bus cycles. The value of the data 602, "3", is previously set as an initial value for a count value of the down counter 62 in the wait controller 9.

(Cycle i13)

Since the bus cycle signal 111 is asserted, the initiating signal 108 is negated. Furthermore, because of the write operation, the data output signal 112 is asserted by the logic circuit 56 in the external access controlling signal generator 8, and the NWE signal is asserted by the logic circuit 58. The data output signal 112 and the NWE signal are asserted one cycle later than the start of the bus cycle by the flip-flop 53 and the logic circuits 56 and 58.

When the data output signal 112 is asserted, the controlling circuit 6 outputs a data controlling signal 115 to the data interface section 11. A value of the data 105 is output to the external data bus 124 in response to the data controlling signal 115. Furthermore, when the NWE signal is asserted, the writing of data to the external device 21 starts.

(Cycle i14)

The write operation to the external device 21 is under way.

(Cycle i15)

The cycle i15 corresponds to the forth cycle from the start of the bus cycle. The count value of the down counter 62 in the wait controller 9 becomes "0". Therefore, a cycle ending signal 113 indicating the end of the bus cycle is asserted. Thus, the bus cycle ends. Furthermore, the data response signal 116 is asserted by the controlling circuit 6. Thus, the write operation to the external device 21 based on the write operation request from the CPU 2 is completed.

As described above, according to the information processing device 1000 of the present invention, the bus interface control is performed in synchronization with the high speed internal clock signal 101 with respect to the external device 20 which operates in asynchronization with the clock signal. Thus, the occurrence of the cycle for waiting for synchronization with the external clock signal 100 can be eliminated. As a result, a high speed access can be realized. Furthermore, according to the information processing device 1000 in the example of the present invention, it is possible to set the number of bus cycles in the cycle unit of the high speed internal clock signal. This makes it possible to perform a high speed access in a wait number suitable for the performance of the external device 20. Furthermore, by dividing the address space into several regions, there can be obtained an advantageous effect of being capable of simultaneously connecting the device 21 which operates in synchronization with the clock signal and the device 20 which operates in asynchronization with the clock signal in a unit of an address space.

The operation is performed with switching the clock signal for only a part of the access controlling signal generator 8 in the bus controller 3, so that it is possible to realize the bus controller 3 without substantially increasing the volume of the hardware.

In the example of the present invention as described above, only the CPU 2 in the processor 1 accesses the device connected to the external bus. However, the present invention is not limited to this example. In the case where a device (e.g., a DMA controller) other than the CPU 2 is to access the device connected to the external bus, or a plurality of devices are to access the device connected to the external bus, the present invention can be applied.

Furthermore, for the external devices in the example of the present invention, the case has been shown where a device which operates in synchronization with a clock signal after inputting the clock signal and a device which operates in asynchronization with a clock signal without inputting the clock signal are connected to the external bus. However, the present invention can be applied to the case where either one of the synchronous device and the asynchronous device is connected to the external bus, or the case where a plurality of devices are connected to the external bus.

Furthermore, in the example of the present invention, a method of performing the detection of the synchronous clock signal based on the synchronous clock data stored in respective address range in the register has been shown. However, it is possible to adopt a method of switching the synchronous clock signal by terminal setting. Alternatively, it is possible to adopt a method in which the CPU 2 detects the synchronous clock signal, and two sets of the read request signal and the write request signal with respect to the bus controller 3 depending on the synchronous clock signal are prepared.

Furthermore, in the example of the present invention, for the access by switching the synchronous clock signals, the case where the external device connected to the external bus is accessed has been shown. However, in the case where the internal devices in the processor 1 operate with a lower speed clock signal than the operation clock signal of the CPU 2, as the external device, it is possible to access the bus between the bus controller 3 and these internal devices by switching the synchronous clock signal at the time of read/write to these internal devices from the CPU 2.

Furthermore, in the example of the present invention, the bus controller 3 controls the end of the bus cycle with respect to the external devices 20 and 21 by the counter provided in the wait controller 9 (referred to as "a fixed wait system"). Instead of the fixed wait system, a system where the signal indicating the end of the bus cycle is returned from the external so that the bus cycle is ended (referred to as "handshaking") can be adopted.

As described above, according to the present invention, the bus interface control is performed in synchronization with the high speed internal clock signal with respect to the external device which operates in asynchronization with the clock signal. Thus, the occurrence of the cycle for waiting for synchronization with the external clock signal can be eliminated. As a result, access can be performed at high speed. Furthermore, according to the present invention, it is possible to set the number of bus cycles in the cycle unit of the high speed internal clock signal. This makes it possible to perform access at a high speed in a wait number suitable for the performance of the external device. Furthermore, by dividing the address space into several regions, there can be obtained an advantageous effect of being capable of simultaneously connecting the device which operates in synchronization with the clock signal and the device which operates in asynchronization with the clock signal in a unit of an address space.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A bus controller for controlling an access to a bus connected to a first device which operates in synchronization with a first clock signal and a second device which operates in asynchronization with the first clock signal, the controller comprising:

a detector for receiving an access request from a central processing unit which operates in synchronization with a second clock signal different from the first clock signal and for detecting whether the access request represents an access to the first device or an access to the second device, the detector including a synchronous clock data storage section having synchronous clock data stored therein indicative of whether an access controlling signal is to be generated in synchronization with the first clock signal or the second clock signal; and an access controlling signal generator, responsive to the detector, for generating a first access controlling signal for controlling an access of the first device to the bus in synchronization with the first clock signal and for supplying the first access controlling signal to the first device in a case where the access request represents the access to the first device, the access controlling signal generator generating a second access controlling signal for controlling an access of the second device to the bus in synchronization with the second clock signal and for supplying the second access controlling signal to the second device in a case where the access request represents the access to the second device.

2. A bus controller according to claim 1, wherein a frequency of the second clock signal is higher than a frequency of the first clock signal.

3. A bus controller according to claim 1, wherein the access request includes at least a part of an address which defines a position to be accessed in the first device and the second device.

4. A bus controller according to claim 1, wherein the synchronous clock data storage section stores a plurality of synchronous clock data, each of the plurality of synchronous clock data determining whether an access to a corresponding address space among a plurality of address spaces is performed in synchronization with the first clock signal or the second clock signal; and a selector for selecting one of the plurality of synchronous clock data stored in the synchronous clock data storage section in accordance with an identifying signal for identifying one of the plurality of address spaces.

5. A bus controller according to claim 1, wherein the access controlling signal generator comprises:

a selector for selecting one of the first clock signal and the second clock signal based on a detection result of the detector; and a generator for generating one of the first access controlling signal and the second access controlling signal based on an output from the selector.

6. A bus controller according to claim 1, further comprising a wait controller for generating a bus cycle ending signal for indicating an end of a bus cycle in synchronization with the second clock signal, and outputting the bus cycle ending signal to the access controlling signal generator.

7. A bus controller according to claim 6, wherein the wait controller comprises:

a wait cycle data storage section for storing a plurality of wait cycle data, each of the plurality of wait cycle data representing a wait cycle number with respect to a corresponding address space among a plurality of address spaces in a cycle unit of the second clock signal;

a selector for selecting one of the plurality of wait cycle data stored in the wait cycle data storage section in accordance with an identifying signal for identifying one of the plurality of address spaces; and a counter for counting a bus cycle number in a cycle unit of the second clock signal based on an output from the selector, and outputting the bus cycle ending signal in a case where the bus cycle number reaches a predetermined value.

8. An information processing device comprising a processor for receiving a first clock signal, a first device operating in synchronization with the first clock signal, a second device operating in asynchronization with the first clock signal and a bus for connecting the processor, the first device and the second device with each other, the processor including:
a frequency synthesizer for generating a second clock signal different from the first clock signal based on the first clock signal;
a central processing unit for operating in synchronization with the second clock signal; and
a bus controller for controlling an access to the bus,
the bus controller including:
a detector for receiving an access request from the central processing unit and for detecting whether the access request represents an access to the first device or an access to the second device, the detector including a synchronous clock data storage section having synchronous clock data stored therein indicative of whether an access controlling signal is to be generated in synchronization with the first clock signal or the second clock signal; and
an access controlling signal generator, responsive to the detector, for generating a first access controlling signal for controlling an access of the first device to the bus in synchronization with the first clock signal and for supplying the first access controlling signal to the first device, in a case where the access request represents the access to the first device, the access controlling signal generator generating a second access controlling signal for controlling an access of the second device to the bus in synchronization with the second clock signal and for supplying the second access controlling signal to the second device, in a case where the access request represents the access to the second device.

9. An information processing device according to claim 8, wherein a frequency of the second clock signal is higher than a frequency of the first clock signal.

10. An information processing device according to claim 8, wherein the access request includes at least a part of an address which defines a position to be accessed in the first device and the second device.

11. An information processing device according to claim 8, wherein the synchronous clock data storage section stores a plurality of synchronous clock data, each of the plurality of synchronous clock data determining whether an access to a corresponding address space among a plurality of address spaces is performed in synchronization with the first clock signal or the second clock signal; and a selector for selecting one of the plurality of synchronous clock data stored in the synchronous clock data storage section in accordance with an identifying signal for identifying one of the plurality of address spaces.

12. An information processing device according to claim 8, wherein the access controlling signal generator comprises:

a selector for selecting one of the first clock signal and the second clock signal based on a detection result of the detector; and a generator for generating one of the first access controlling signal and the second access controlling signal based on an output from the selector.

13. An information processing device according to claim 8, further comprising a wait controller for generating a bus cycle ending signal for indicating an end of a bus cycle in synchronization with the second clock signal, and outputting the bus cycle ending signal to the access controlling signal generator.

14. An information processing device according to claim 13, wherein the wait controller comprises:

a wait cycle data storage section for storing a plurality of wait cycle data, each of the plurality of wait cycle data representing a wait cycle number with respect to a corresponding address space among a plurality of address spaces in a cycle unit of the second clock signal;

a selector for selecting one of the plurality of wait cycle data stored in the wait cycle data storage section in accordance with an identifying signal for identifying one of the plurality of address spaces; and a counter for counting a bus cycle number in a cycle unit of the second clock signal based on an output from the selector, and outputting the bus cycle ending signal in a case where the bus cycle number reaches a predetermined value.

* * * * *